United States Patent
Yu et al.

(10) Patent No.: US 11,362,617 B2
(45) Date of Patent: Jun. 14, 2022

(54) SELF-GENERATING SMART GLASS

(71) Applicant: SOUTHWEST PETROLEUM UNIVERSITY, Sichuan (CN)

(72) Inventors: Hua Yu, Sichuan (CN); Wenfeng Zhang, Sichuan (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 262 days.

(21) Appl. No.: 16/809,410

(22) Filed: Mar. 4, 2020

(65) Prior Publication Data
US 2020/0287503 A1  Sep. 10, 2020

(30) Foreign Application Priority Data

Mar. 5, 2019 (CN) .......................... 201910164977.X

(51) Int. Cl.
*H02S 20/30* (2014.01)
*H02S 30/20* (2014.01)
*H02S 40/30* (2014.01)
*E06B 7/28* (2006.01)
*E06B 9/24* (2006.01)
*H02S 20/22* (2014.01)

(52) U.S. Cl.
CPC ............... *H02S 20/30* (2014.12); *E06B 7/28* (2013.01); *E06B 9/24* (2013.01); *H02S 30/20* (2014.12); *H02S 40/30* (2014.12); *E06B 2009/2476* (2013.01); *H02S 20/22* (2014.12)

(58) Field of Classification Search
CPC .......... H02S 20/30; H02S 30/20; H02S 40/30; E06B 7/28; E06B 9/24
See application file for complete search history.

(56) References Cited

U.S. PATENT DOCUMENTS

2013/0242370 A1    9/2013  Wang

FOREIGN PATENT DOCUMENTS

| CN | 205450829 U | 8/2016 |
| CN | 106988457 | 7/2017 |
| KR | 100994381 B1 * | 11/2010 |
| KR | 20120110697 A * | 10/2012 |

OTHER PUBLICATIONS

Lee Eun Kwan, KR 100994381 B1, English Machine Translation (Year: 2010).*
Park Dae Woo, KR 20120110697 A, English Machine Translation (Year: 2012).*

* cited by examiner

*Primary Examiner* — Tae-Sik Kang

(57) ABSTRACT

Provided is a self-generating smart glass, including: a window frame, an outer glass and an inner glass, a plurality of solar panels, a first electric telescopic rod, a plurality of slide grooves which are symmetrically arranged on a top and a bottom of the window frame, a foldable plate located between the outer glass and the inner glass, a first battery, a light sensor and a control system. Two adjacent outer surfaces of the foldable plate are provided with the solar panels which are connected in series through flexible wires and communicated with the first battery. The first electric telescopic rod, the light sensor and the control system are respectively connected to the power supply; and the first electric telescopic rod and the light sensor are respectively connected to the control system.

8 Claims, 3 Drawing Sheets

SELF-GENERATING SMART GLASS

CROSS-REFERENCE TO RELATED APPLICATIONS

This application claims the benefit of priority from Chinese Patent Application No. 201910164977.X, filed on Mar. 5, 2019. The content of the aforementioned application, including any intervening amendments thereto, is incorporated herein by reference in its entirety.

TECHNICAL FIELD

This application relates to smart glass, and more particularly to a self-generating smart glass.

BACKGROUND OF THE INVENTION

Houses are usually designed with large areas of glass windows to allow more light to enter the houses. However, because of large-area glass windows, the interiors become too hot in summer, and the use of air conditioners causes much more power consumption. Solar energy, as a natural energy source, is inexhaustible. Therefore, it is a potential demand to make full use of the glass windows for power generation.

SUMMARY OF THE INVENTION

The invention provides a self-generating smart glass to solve technical problems in prior art.

Provided is a self-generating smart glass, comprising:
a window frame,
an outer glass that is arranged in the window frame and on an outer side of the window frame,
an inner glass that is arranged in the window frame and on an inner side of the window frame,
a plurality of solar panels,
a first electric telescopic rod which is retractable along a length of the window frame,
a plurality of slide grooves which are symmetrically arranged on a top and a bottom of the window frame,
a foldable plate located between the outer glass and the inner glass,
a first battery,
a light sensor, and
a control system;
wherein an upper end and a lower end of the foldable plate are respectively installed in the symmetrical slide grooves; one end of the foldable plate is fixed on a side of the window frame, and the other end of the foldable plate is fixedly connected to a free end of the first electric telescopic rod; each folding surface of an outer side of the foldable plate is provided with a solar panel, and the solar panels are connected in series through flexible wires and communicated with the first battery through wires; a control button is provided at the inner side of the window frame; the first electric telescopic rod is communicated with a power supply via the control button; the first electric telescopic rod, the light sensor and the control system are respectively connected to the power supply; and the first electric telescopic rod and the light sensor are respectively connected to the control system.

In some embodiments, the invention further comprises:
a cylinder that is fixed on the top of the window frame and located at a side of the outer glass,
an automatic reel arranged in the cylinder,
a flexible solar panel wound on the automatic reel,
a second electric telescopic rod, and
a second battery;
wherein a front end of the flexible solar panel passes the cylinder and is hinged to a front end of the second electric telescopic rod through a connection plate; a rear end of the second electric telescopic rod is hinged to the window frame; the flexible solar panel is connected to the second battery; and the second electric telescopic rod is communicated with the power supply and the control system through wires.

In some embodiments, the invention further comprises a support rod and a miniature wind power generator, wherein a shield plate is fixed on a top of the cylinder; the support rod is provided on a top of the shield plate; and the miniature wind power generator is provided on a top of the support rod; the miniature wind power generator is connected to the second battery through wires.

In some embodiments, there are two foldable plates and two first electric telescopic rods; outer ends of the two foldable plates are respectively fixed on the right and left sides of the window frame; rear ends of the two first electric telescopic rods are respectively fixed on the right and left sides of the window frame; free ends of the two first electric telescopic rods are respectively connected to inner ends of the two foldable plates; and the inner ends of the two foldable plates are respectively provided with an iron sheet and a magnet bar which are matched with each other and detachably connected.

In some embodiments, the outer glass is made from 0.5~0.55% by weight of MgO, 0.5~0.55% by weight of $Na_2O$, 60~61% by weight of $SiO_2$, 12~12.5% by weight of $Al_2O_3$, 6.0~6.5% by weight of $K_2O$, 1~1.2% by weight of $ZrO_2$ and 0.3~0.4% by weight of $Li_2O$, wherein a Fe content in the outer glass, based on $Fe_2O_3$, is 100 ppm or less.

In some embodiments, the inner glass is smart glass and communicates with the first battery through an electromagnetic switch, and the electromagnetic switch is connected to the control system.

In some embodiments, accommodating cavities are provided on the right and left sides of the window frame, and the two first electric telescopic rods and the two foldable plates are received in the accommodating cavities.

In some embodiments, the control system comprises a microcontroller and a display screen; the microcontroller and the display screen are respectively connected to the power supply; and the display screen, the first electric telescopic rod, the light sensor, the second electric telescopic rod, the first battery and the second battery are respectively connected to the microcontroller.

Compared with the prior arts, the invention has the following beneficial effects.

In the present invention, the outer glass and the inner glass are provided in the window frame, and a pull-push foldable plate is arranged between the outer and inner glasses. The pull-push foldable plate is provided with a plurality of solar panels, and two adjacent solar panels are connected by the flexible wires. The solar panels are connected to the first battery, and the light intensity of the sunlight is sensed by the light sensor. The control system controls the first electric telescopic rod to drive the foldable plate to extend or retract to block the sunlight and generate electricity at the same time according to light intensity signals of the sunlight. The smart glass of the present invention is automatically controlled to generate electricity, which is convenient to use.

By setting the cylinder on the top of the window frame and the automatic reel in the cylinder, the flexible solar panel is wound on the automatic reel, and the flexible solar panel is extended or retracted by the light sensor, the control system and the second electric telescopic rod and the automatic reel. The invention generates power by the flexible solar panel, in which the smart glass is automatically controlled, which is convenient to use.

Figure 1:
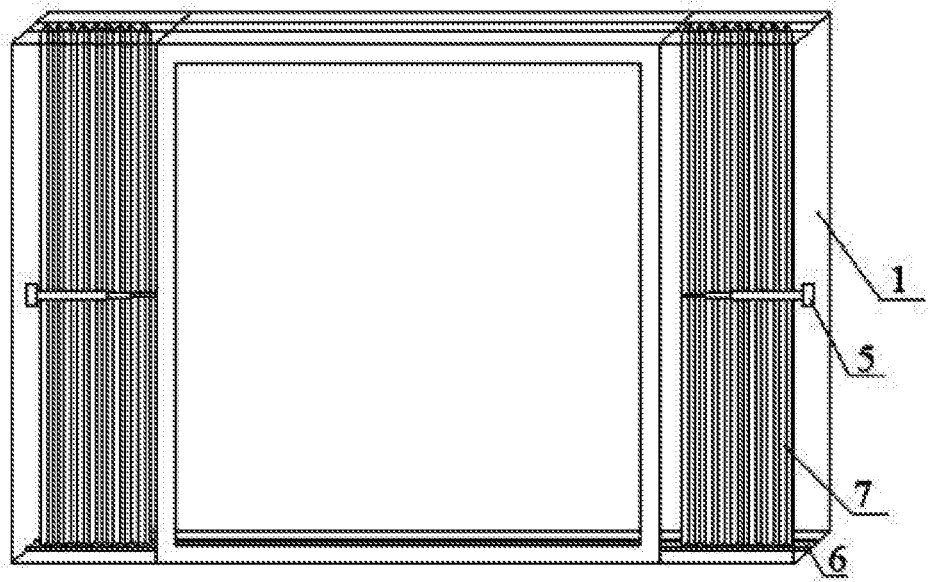
FIG. 1 is a front view of a self-generating smart glass according to the present invention.

In the drawings, 1—window frame, 2—outer glass, 3—inner glass, 4—solar panel, 5—first electric telescopic rod, 6—slide groove, 7—foldable plate, 8—cylinder, 9—automatic reel, 10—flexible solar panel, 11—second electric telescopic rod, 12—shield plate, 13—support rod, 14—miniature wind power generator, 15—flexible wire.

DETAILED DESCRIPTION OF EMBODIMENTS

An embodiment of the invention will be described in detail with reference to the accompanying drawings. It should be understood that the invention is not intended to limit the scope of the embodiment.

Figure 2:
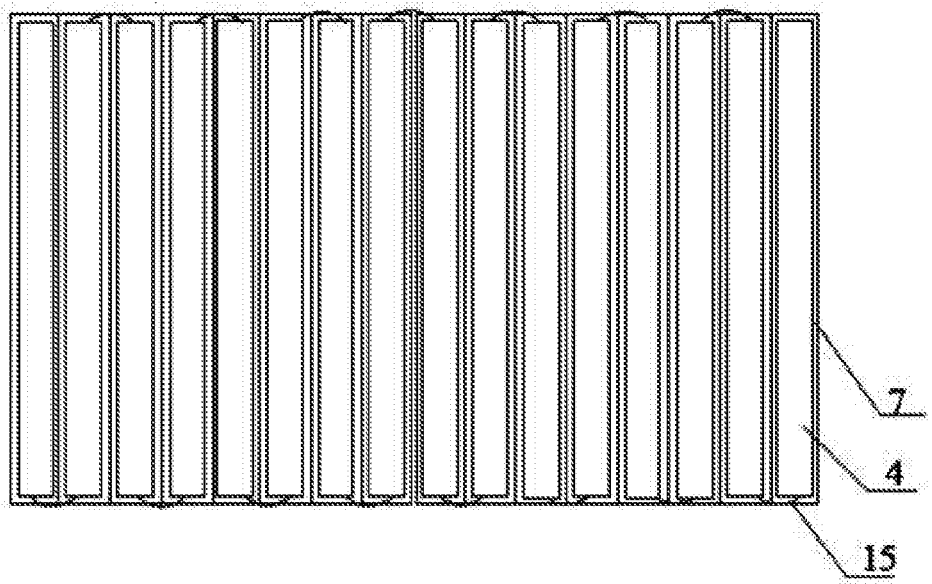
FIG. 2 schematically shows a foldable plate of the self-generating smart glass according to the present invention.
Figure 4:
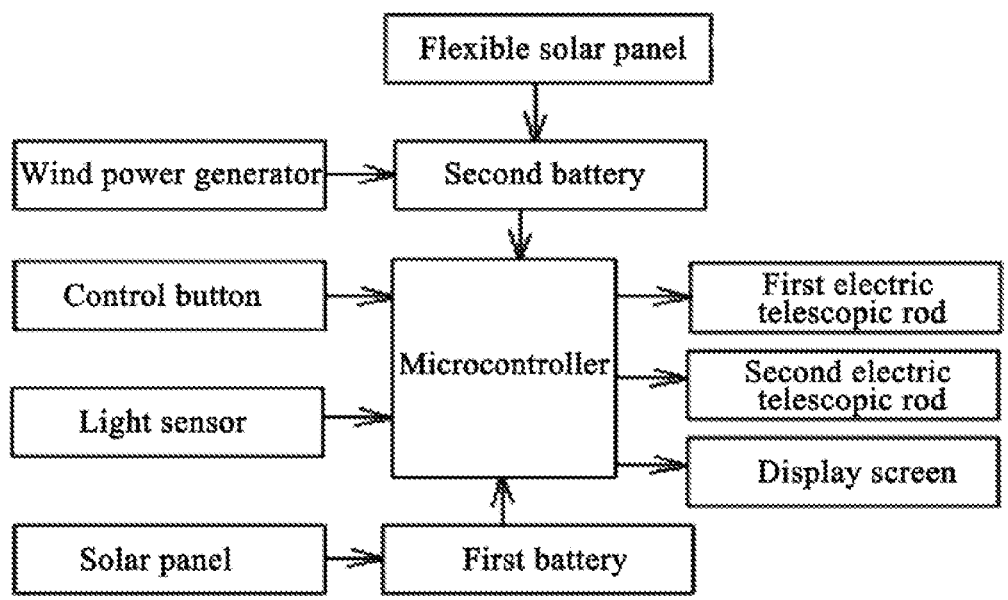
FIG. 4 is a block diagram showing a control principle of the self-generating smart glass according to the embodiment of the present invention.

As shown in FIGS. 1, 2 and 4, the invention provides a self-generating smart glass, which includes a window frame 1, an outer glass 2 and an inner glass 3, a plurality of solar panels 4, a first electric telescopic rod 5, a plurality of slide grooves 6, a foldable plate 7, a first battery, a light sensor and a control system.

The outer glass 2 is installed in an outer side of the window frame 1, and the inner glass 3 is installed in an inner side of the window frame 1. The foldable plate 7 is located between the outer glass 2 and the inner glass 3; the slide grooves 6 are symmetrically arranged on a top and a bottom of the window frame 1, and an upper end and a lower end of the foldable plate 7 are respectively installed in the symmetrical slide grooves 6. The first electric telescopic rod 5 is retractable in a length direction of the window frame 1. One end of the foldable plate 7 is fixed on a side of the window frame 1, and the other end of the foldable plate 7 is fixedly connected to a free end of the first electric telescopic rod 5. Each folding surface of an outer side of the foldable plate 7 is provided with a solar panel 4; and the solar panels 4 are connected in series through flexible wires 15, and communicated with the first battery through wires. A control button is provided at the inner side of the window frame 1. The first electric telescopic rod 5 is communicated with a power supply via the control button; the first electric telescopic rod 5, the light sensor and the control system are respectively connected to the power supply; and the first electric telescopic rod 5 and the light sensor are respectively connected to the control system.

The use method and working principles of the above structures are described as follows.

The light sensor monitors a light intensity of sunlight, and sends light intensity signals of the sunlight to the control system. The control system compares the monitored light intensity with a set value; when the light intensity is higher than the set value, the control system controls the first electric telescopic rod 5 to extend, and then the first electric telescopic rod 5 drives the foldable plate 7 to unfold along the slide grooves 6 to block the solar rays. The foldable plate 7 is a foldable corrugated plastic plate, and the solar panels 4 are photovoltaic films. At the same time, the solar panels 4 convert the sunlight into electric energy to be stored in the first battery. The invention is capable of automatically sensing the intensity of the sunlight, and the foldable plate 7 is unfolded or folded according to the intensity of the sunlight, realizing intelligent power generation by converting the solar energy into the electric energy via the solar panels 4 on the outer surface of the foldable plate 7. The smart glass of the invention is automatically controlled to avoid high indoor temperature caused by strong sunlight entering the room through the glass. The extending or retracting of the first electric telescopic rod 5 is also manually controlled through the control button, so that the foldable plate 7 is allowed to work as a curtain. Therefore, the smart glass of the invention generates electricity and blocks sunlight in the daytime and works as a curtain in the evening, so that the curtain is eliminated, which is convenient to use.

The control system includes a microcontroller, which is respectively connected to the first electric telescopic rod 5 and the light sensor.

Figure 3:
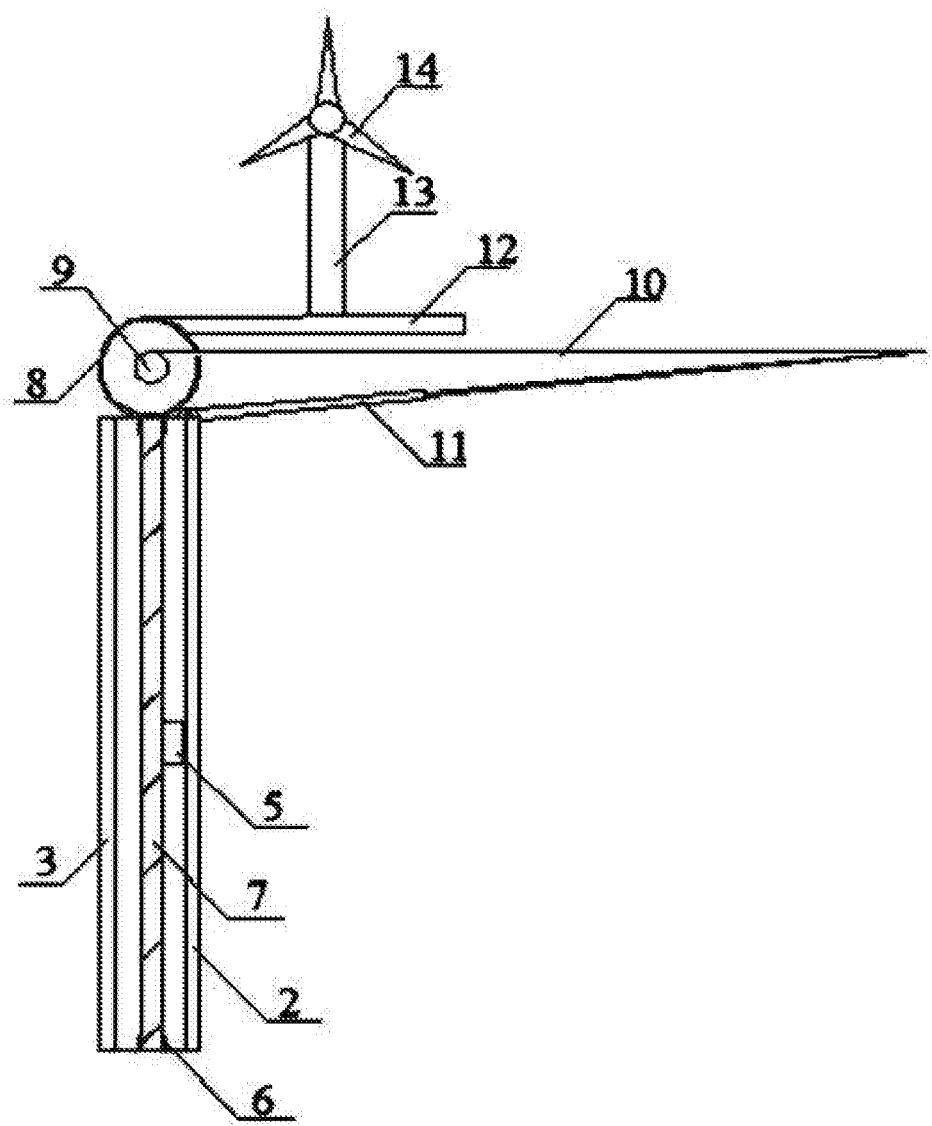
FIG. 3 is a schematic diagram of the self-generating smart glass according to an embodiment of the present invention.

As shown in FIGS. 3 and 4, the self-generating smart glass of the invention further includes a cylinder 8, an automatic reel 9, a flexible solar panel 10, a second electric telescopic rod 11 and a second battery. The cylinder 8 is fixed on the top of the window frame 1 and located at a side of the outer glass 2; the automatic reel 9 is arranged in the cylinder 8; the flexible solar panel 10 is wound on the automatic reel 9; a front end of the flexible solar panel 10 passes the cylinder 8 and is hinged to a front end of the second electric telescopic rod 11 through a connection plate; a rear end of the second electric telescopic rod 11 is hinged to the window frame 1; the flexible solar panel 10 is connected to the second battery; and the second electric telescopic rod 11 is communicated with the power supply and the control system through wires.

The use method and working principles of the above structures are described as follows.

In order to make full use of solar energy for power generation, in this embodiment, the flexible solar panel 10 is wound on the automatic reel 9. When the intensity of the sunlight sensed by the light sensor is greater than an intensity of the sunlight set by the microcontroller, the microcontroller controls the second electric telescopic rod 11 to extend and push the flexible solar panel 10 out of the automatic reel 9 through the connection plate. The flexible solar panel 10 converts sunlight into electrical energy to be stored in the second battery, so that the solar energy can be fully used for power generation. When the intensity of the sunlight sensed by the light sensor is less than the intensity of the sunlight set by the microcontroller, the microcontroller controls the second electric telescopic rod 11 to retract and pull the flexible solar panel 10 through the connection plate, and at the same time, because of a coil spring in the automatic reel 9, the flexible solar panel 10 is wound on the automatic reel 9. The smart glass of the present invention is automatically controlled to generate electricity, and makes full use of solar energy, which is convenient to use. Besides, the cylinder 8 protects the flexible solar panel 10.

As shown in FIGS. 3 and 4, the self-generating smart glass of the invention further includes a support rod 13 and a miniature wind power generator 14, where a shield plate 12 is provided at a top of the cylinder 8; the support rod 13 is provided on a top of the shield plate 12; the miniature wind power generator 14 is provided on a top of the support rod 13 and is connected to the second battery through wires.

The use method and working principles of the present invention are described as follows.

The shield plate 12, provided on the cylinder 8, not only shields and protects the flexible solar panel 10, but also supports the miniature wind power generator 14 together with the support rod 13. Since that wind energy is an important clean energy source, the wind power generator 14 converts wind energy into mechanical energy and then converts mechanical energy into electrical energy. The miniature wind power generator 14 is an existing miniature wind power generator.

There are two foldable plates 7 and two first electric telescopic rods 5; outer ends of the two foldable plates 7 are respectively fixed on the right and left sides of the window frame 1; rear ends of the two first electric telescopic rods 5 are respectively fixed on the right and left sides of the window frame 1; free ends of the two first electric telescopic rods 5 are respectively connected to inner ends of the two foldable plates 7; and the inner ends of the two foldable plates 7 are respectively provided with an iron sheet and a magnet bar which are matched with each other and detachably connected.

In order to make the glass symmetrical and beautiful, two foldable plates 7 and two first electric telescopic rods 5 are provided. After unfolded, the two foldable plates 7 attract each other via the iron sheet and the magnet bar which are matched with each other and detachably connected, avoiding that the sunlight enters interiors from a gap between the two foldable plates 7.

The outer glass 2 is made from 0.5~0.55% by weight of MgO, 0.5~0.55% by weight of $Na_2O$, 60~61% by weight of $SiO_2$, 12~12.5% by weight of $Al_2O_3$, 6.0~6.5% by weight of $K_2O$, 1~1.2% by weight of $ZrO_2$ and 0.3~0.4% by weight of $Li_2O$, where a Fe content in the outer glass, based on $Fe_2O_3$, is 100 ppm or less.

In order to improve a light transmittance of the outer glass 2 and reduce a content of transition metal ions in the outer glass 2, the invention strictly controls contents of MgO, $Na_2O$ and Fe in the outer glass 2. When the content of Fe is 100 ppm or less, a visible light transmittance of the outer glass 2 with a thickness of 1 mm is 92% or more. The outer glass 2 made of the above materials has a high light transmittance, strengthened mechanical property and weathering resistance, which is capable of resisting harsh environments such as sand, wind, rain and snow, so that the service life of the smart glass of the present invention is improved.

The inner glass 3 is smart glass and communicates with the first battery through an electromagnetic switch which is connected to the control system.

The smart glass will automatically be dim as the sunlight radiation increases. On the contrary, the smart glass under shadows will start to brighten, so that buildings equipped with the smart glass reduce energy consumptions of heating and cooling by 25%, of illumination by 60% and of peak electricity demand by 30%, which saves energy.

Accommodating cavities are respectively provided on the right and left sides of the window frame 1, and when the two first electric telescopic rods 5 and the two foldable plates 7 are retracted, they are received in the accommodating cavities, so that when not generating power, two sides of the smart glass will not be blocked by the two foldable plates 7, thereby having an attractive appearance.

The control system includes the microcontroller and a display screen which are respectively connected to the power supply, and the display screen, the first electric telescopic rod 5, the light sensor, the second electric telescopic rod 11, the first battery and the second battery are respectively connected to the microcontroller. The display screen is configured to display electric quantities of the first and second batteries.

In the present invention, the outer glass 2 and the inner glass 3 are provided in the window frame 1, and a pull-push foldable plate 7 is arranged between the outer and inner glasses. The pull-push foldable plate 7 is provided with a plurality of solar panels 4, and two adjacent solar panels 4 are connected by the flexible wires 15. The solar panels 4 are connected to the first battery, and the light intensity of the sunlight is sensed by the light sensor. The control system controls the first electric telescopic rod 5 to drive the foldable plate 7 to extend or retract to block the sunlight and generate electricity at the same time according to light intensity signals of the sunlight. The smart glass of the present invention is automatically controlled to generate electricity, which is convenient to use.

By setting the cylinder 8 on the top of the window frame 1 and the automatic reel 9 in the cylinder 8, the flexible solar panel 10 is wound on the automatic reel 9, and the flexible solar panel 10 is extended or retracted by the light sensor, the control system and the second electric telescopic rod 11 and the automatic reel 9. The invention generates power by the flexible solar panel, in which the smart glass is automatically controlled, which is convenient to use.

Described above are merely preferred embodiments of the invention, and are not intended to limit the scope of the invention. Any variations made by those skilled in the art without departing from the spirit of the invention should fall within the scope of the invention.

What is claimed is:

1. A self-generating smart glass, comprising:
   a window frame,
   an outer glass that is arranged in the window frame and on an outer side of the window frame,
   an inner glass that is arranged in the window frame and on an inner side of the window frame,
   a plurality of solar panels,
   a first electric telescopic rod which is retractable along a length of the window frame,
   a plurality of slide grooves which are symmetrically arranged on a top and a bottom of the window frame,
   a foldable plate located between the outer glass and the inner glass,
   a first battery,
   a light sensor, and
   a control system;
   wherein an upper end and a lower end of the foldable plate are respectively installed in the plurality of slide grooves; one end of the foldable plate is fixed on a side of the window frame, and the other end of the foldable plate is fixedly connected to a free end of the first electric telescopic rod; each of a plurality of folding surfaces of an outer side of the foldable plate is provided with each of a plurality of solar panels, and the plurality of solar panels are connected in series through flexible wires and communicated with the first battery through wires; a control button is provided at the inner side of the window frame; the first electric telescopic rod is communicated with a power supply via the control button; the first electric telescopic rod, the light sensor and the control system are respectively connected to the power supply; and the first electric telescopic rod and the light sensor are respectively connected to the control system.

2. The self-generating smart glass of claim 1, further comprising:
a cylinder that is fixed on the top of the window frame and located at a side of the outer glass,
an automatic reel arranged in the cylinder,
a flexible solar panel wound on the automatic reel,
a second electric telescopic rod, and
a second battery;
wherein a front end of the flexible solar panel passes the cylinder and is hinged to a front end of the second electric telescopic rod through a connection plate; a rear end of the second electric telescopic rod is hinged to the window frame; the flexible solar panel is connected to the second battery; and the second electric telescopic rod is communicated with the power supply and the control system through wires.

3. The self-generating smart glass of claim 2, further comprising: a support rod and a miniature wind power generator, wherein a shield plate is fixed on a top of the cylinder; the support rod is provided on a top of the shield plate; the miniature wind power generator is provided on a top of the support rod; and the miniature wind power generator is connected to the second battery through wires.

4. The self-generating smart glass of claim 1, wherein there are two foldable plates and two first electric telescopic rods; outer ends of the two foldable plates are respectively fixed on right and left sides of the window frame; rear ends of the two first electric telescopic rods are respectively fixed on the right and left sides of the window frame; free ends of the two first electric telescopic rods are respectively connected to inner ends of the two foldable plates; and the inner ends of the two foldable plates are respectively provided with an iron sheet and a magnet bar which are matched with each other and detachably connected.

5. The self-generating smart glass of claim 1, wherein the outer glass is made from 0.5~0.55% by weight of MgO, 0.5~0.55% by weight of $Na_2O$, 60~61% by weight of $SiO_2$, 12~12.5% by weight of $Al_2O_3$, 6.0~6.5% by weight of $K_2O$, 1~1.2% by weight of $ZrO_2$ and 0.3~0.4% by weight of $Li_2O$, wherein a Fe content in the outer glass, based on $Fe_2O_3$, is 100 ppm or less.

6. The self-generating smart glass of claim 1, wherein the inner glass is smart glass and communicates with the first battery through an electromagnetic switch, and the electromagnetic switch is connected to the control system.

7. The self-generating smart glass of claim 4, wherein accommodating cavities are provided on the right and left sides of the window frame, and the two first electric telescopic rods and the two foldable plates are received in the accommodating cavities.

8. The self-generating smart glass of claim 2, wherein the control system comprises a microcontroller and a display screen; the microcontroller and the display screen are respectively connected to the power supply; and the display screen, the first electric telescopic rod, the light sensor, the second electric telescopic rod, the first battery and the second battery are respectively connected to the microcontroller.

* * * * *